United States Patent
Kasashima et al.

[11] Patent Number: 5,874,038
[45] Date of Patent: Feb. 23, 1999

[54] INJECTION MOLD FOR GOLF BALLS AND METHOD FOR PREPARING GOLF BALLS

[75] Inventors: Atsuki Kasashima; Keisuke Ihara; Hirotaka Shimosaka; Yutaka Masutani; Michio Inoue, all of Chichibu, Japan

[73] Assignee: Bridgestone Sports Co., Ltd., Tokyo, Japan

[21] Appl. No.: 961,016

[22] Filed: Oct. 30, 1997

[30] Foreign Application Priority Data

Nov. 1, 1996 [JP] Japan .................................. 8-307365

[51] Int. Cl.⁶ ............................ B29C 45/14; B29C 45/27
[52] U.S. Cl. .................. 264/279; 264/279.1; 264/328.1; 425/116; 425/129.1; 425/573
[58] Field of Search ..................... 425/116, 120, 425/129.1, 570, 573; 264/275, 279, 279.1, 328.1, 328.8

[56] References Cited

U.S. PATENT DOCUMENTS

| | | | |
|---|---|---|---|
| 4,653,758 | 3/1987 | Solheim | 264/239 |
| 4,959,000 | 9/1990 | Giza | 425/116 |
| 5,122,046 | 6/1992 | Lavallee | 425/116 |
| 5,407,341 | 4/1995 | Endo et al. | 425/116 |
| 5,458,473 | 10/1995 | Banji | 425/116 |

*Primary Examiner*—James P. Mackey
*Attorney, Agent, or Firm*—Sughrue, Mion, Zinn Macpeak & Seas, PLLC

[57] ABSTRACT

An injection mold for golf balls includes a pair of separable mold segments (1a, 1b). The mold segments (1a, 1b) are mated at their peripheral surfaces (12) along a parting line so that their inner surfaces (2a) define a spherical cavity (2). A plurality of dimple-forming projections (11) are formed on the inner surfaces (2a). At least four tubular gates (7) are disposed in the peripheral surfaces (12) and in fluid communication with the cavity (2). The peripheral surfaces (12) are furrowed except for the areas where the gates are disposed. Dimple-forming pins (14) are received in furrows (13) so as to lie across the parting line (PL). A molten stock material is injected into the cavity (2) through the gates (7) to mold a golf ball having dimples lying across the parting line.

13 Claims, 5 Drawing Sheets

INJECTION MOLD FOR GOLF BALLS AND METHOD FOR PREPARING GOLF BALLS

BACKGROUND OF THE INVENTION

1. Field of the Invention

This invention relates to an injection mold for the manufacture of golf balls and to a method for preparing golf balls using the mold.

2. Prior Art

Most prior art methods for the manufacture of golf balls using molds employ injection molding and heat compression molding techniques. Especially in the case of golf balls consisting of a core and a cover, injection molding and heat compression molding techniques are typically used for molding the cover around the core.

The heat compression molding technique involves the steps of preforming hemispherical half cups from cover stock, enclosing a core with a pair of half cups, and placing the entirety in a heat compression mold where the ball is molded under suitable temperature and pressure conditions. In contrast, the injection molding technique produces a golf ball by placing a core in a cavity at the center and injecting molten stock material into the cavity through gates to mold the material around the core.

Referring to FIGS. 5A and 5B, there is illustrated an injection mold which is advantageously used when the cover stock is injection molded around a solid core or wound core. The illustrated example refers to the manufacture of two-piece solid golf balls. A typical prior art injection mold is illustrated as comprising a pair of separable upper and lower mold segments 1a and 1b. The mold segments 1a and 1b define a spherical cavity 2 when mated along a parting line PL. The mold includes a main runner 4, an annular cold runner 5 connected to the main runner 4, extending along the parting line PL and circumscribing the cavity 2, a plurality of circumferentially equally spaced nozzles 6 extending radially inwardly from the annular cold runner 5, and a corresponding plurality of gates 7 extending from the nozzles 6 and opening to the cavity 2. With this construction, a golf ball is manufactured by placing a core 3 at the center of the mold cavity 2, and supplying a cover stock based on a thermoplastic resin to the annular cold runner 5 through the main runner 4, thereby injecting the cover stock into the cavity 2 from the runner 5 through the nozzles 6 and gates 7.

From another aspect, it is desired for golf balls to have dimples evenly distributed on the spherical surface so that the ball may exert consistent performance regardless of shot positions. That is, golf balls which are improved not only in flight performance, but also in symmetry are desired. The demand for such improvements is increasing as the golf game becomes popular to a larger public. In order that high quality, high performance golf balls be delivered at a reasonable price, it is necessary to increase the cost performance, that is, the manufacturing efficiency of golf balls.

Golf balls, especially their covers are generally molded by injection molding and heat compression molding techniques as mentioned above. Most often, a mold comprising a pair of separable mold segments is used in either technique. A straight parting line is generally defined between the upper and lower mold segments. Corrugations are eliminated from the parting line for the purpose of simple manufacture of a mold. The straight parting line coincides with the equator line on the golf ball surface. As a consequence, since no dimples can be formed on the equator line corresponding to the parting line, the golf ball molded using this mold has a great circle band of a certain width along the equator line.

The golf ball having a wide great circle band along the equator line across which no dimples lie, however, has the problem that the ball exhibits varying flight performance depending on a particular impact position because the difficulty in uniformly arranging dimples on the spherical surface of the ball deteriorates the aerodynamic symmetry of the ball.

To overcome the problem, there were proposed several golf balls in which a wide great circle band on the equator line is eliminated and instead, dimples are formed on the equator line (see JP-A 173907/1986 and 143349/1994).

These proposals use a heat compression mold having no gates at the parting surface rather than an injection mold having gates at the parting surface. There have been proposed no injection molds which can effectively mold golf balls having dimples across the parting line.

SUMMARY OF THE INVENTION

Therefore, an object of the invention is to provide an injection mold of the split type which enables the injection molding at a reasonable cost of a golf ball having dimples lying across the parting line and exhibiting improved flight performance and symmetry. Another object of the invention is to provide a method for effectively preparing a golf ball using the injection mold.

The present invention provides an injection mold for golf balls comprising a pair of separable mold segments each having an inner surface and a peripheral surface. The mold segments are mated at their peripheral surfaces along a parting line so that their inner surfaces define a spherical cavity. A plurality of dimple-forming projections are formed on the inner surfaces of the mold segments. At least four tubular gates are disposed in the peripheral surfaces of the mold segments and in fluid communication with the cavity. The peripheral surfaces of the mold segments are corrugated except for the areas where the gates are disposed. Dimple-forming projections are disposed at the corrugations so as to lie across the parting line.

In one preferred embodiment, the corrugations in the peripheral surfaces of the mold segments are semi-circular furrows which are arranged such that each pair of opposed semi-circular furrows define a cylindrical hole having a diameter corresponding to a desired dimple diameter when the mold segments are mated. A cylindrical pin having an inner end portion of dimple-forming shape is received in the cylindrical hole.

Using an injection molding machine equipped with the mold comprising at least four gates disposed in the parting peripheral surfaces of the mold segments and cylindrical dimple-forming pins disposed in the same surfaces between the gates, seamless golf balls of good symmetry can be injection molded at a low cost. Since the dimple-forming pins are received in the cylindrical holes between the peripheral surfaces, it becomes possible to prevent burrs from extending into the dimples lying across the parting line. By adjusting the projection distance of dimple-forming pins, the depth of dimples arranged on the parting line can be easily controlled.

In another preferred embodiment, the peripheral surfaces of the mold segments are formed with the semi-circular furrows to define 5 to 20 cylindrical holes, and the cylindrical pin is received in each cylindrical hole. Golf balls having superior aerodynamic performance and symmetry are readily manufactured while the mold maintains strength substantially unchanged.

In a further preferred embodiment, the diameter of the cylindrical holes is 2 to 4.5 mm. Then dimples having the corresponding diameter of 2 to 4.5 mm can be formed along the parting line. Also, cylindrical holes may have two or more different diameters. Then dimples having the corresponding different diameters can be formed along the parting line. This embodiment permits a more symmetric dimple arrangement to be applied to the mold.

In a still further preferred embodiment, the cylindrical pin is received in the cylindrical hole such that the inner end portion of the cylindrical pin projects to a projection distance which is greater by at least 5 $\mu$m than the projection distance of those dimple-forming projections of the same diameter disposed near the poles of the hemi-spherical inner surfaces of the mold segments. After a ball as molded is polished along the parting line for deburring purpose, the resulting ball satisfies the parameter of symmetry associated with the dimple depth.

According to another aspect of the invention, a golf ball is prepared by injecting a stock material into the cavity of the above-defined injection mold through the gates. That is, a golf ball is injection molded using the above-defined mold. Since this method permits the gates to be reduced in diameter and arranged to open at land areas of the ball, the formation of burrs is minimized and the extension of burrs to the dimples is prevented. Since the burden of post treatment is mitigated and since the steps of preforming half cups and enclosing a core with the half cups as required in the heat compression molding technique are unnecessary, golf balls can be efficiently manufactured at a low cost. The golf ball manufactured by the present method is outstandingly improved in aerodynamic symmetry in that several dimples lie across the parting line and there exist no great circles which do not intersect with the dimples. The variation of flight performance dependent on shot positions is eliminated. There is manufactured a golf ball of quality featuring good symmetry and consistent flight performance.

BRIEF DESCRIPTION OF THE ACCOMPANYING DRAWINGS

The above and other objects, features and advantages of the invention will be more fully understood by reading the following description, taken in conjunction with the accompanying drawings.

DETAILED DESCRIPTION OF THE INVENTION

Referring to FIGS. 1 to 4, there are illustrated mold segments of an injection mold according to the invention. Since the basic overall structure of the mold is the same as the mold shown in FIG. 5, like parts are designated by the same numerals as in FIG. 5. Also, since the upper mold segment has substantially the same construction as the lower mold segment, reference is mainly made to the lower mold segment, hereinafter.

Figure 1:
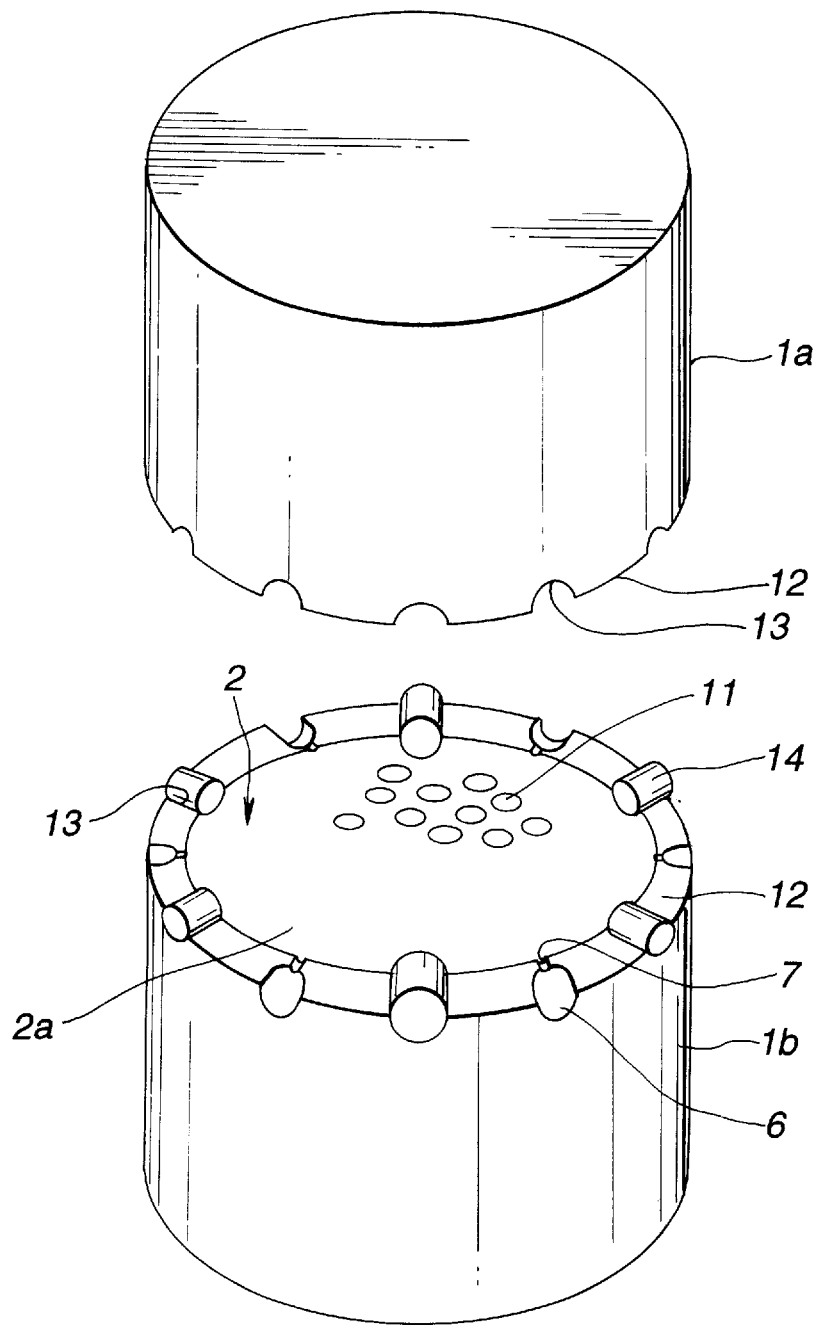
FIG. 1 is a schematic perspective view of an injection mold according to one embodiment of the invention, illustrating separated upper and lower mold segments.
Figure 2:
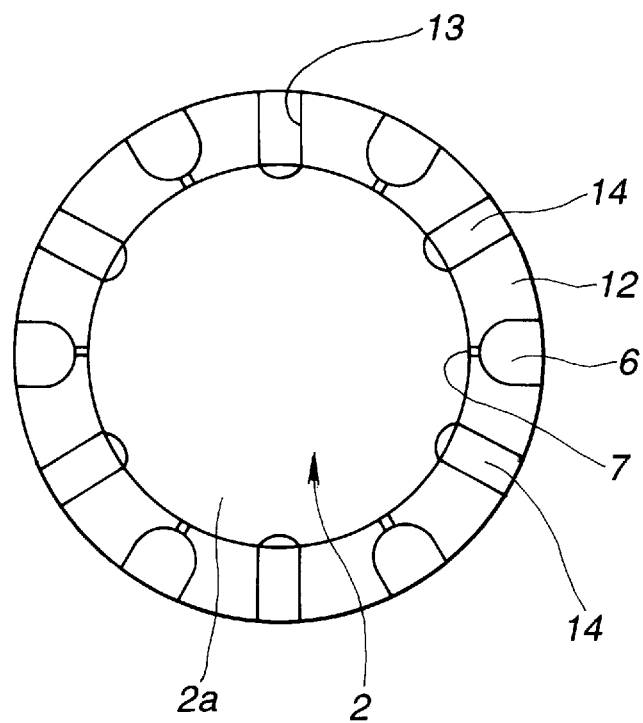
FIG. 2 is a plan view of the lower mold segment at the parting line.

First referring to FIGS. 1 and 2, the lower segment 1b of the mold has a hemi-spherical inner surface 2a defining a cavity 2 and a flat peripheral surface 12 serving as a parting surface. The cavity-defining inner surface 2a is provided with a plurality of dimple-forming projections 11.

In the peripheral surface 12 of the lower segment 1b, at least four (six in FIG. 1) tubular gates 7 are disposed at an equal spacing. The gates 7 are in fluid communication with the cavity 2 so that the stock material may be melted and injected into the cavity 2 through the gates 7 by means of an injection molding machine. More particularly, the peripheral surface 12 of the lower segment 1b is formed with grooves so that each pair of opposing grooves define a gate 7 in the form a tubular hole when the upper and lower mold segments are mated. The cross-sectional shape of the gate 7 is not critical although a circular shape is preferred. The gate of circular cross section preferably has a diameter of about 0.5 to 2 mm, especially about 0.8 to 1.5 mm. The number of gates is at least 4, preferably 6 to 12, more preferably 6 to 8. With less than 4 gates, the melt would not be quickly distributed throughout the cavity, resulting in molding defects such as sink marks and weld lines. The mold having more than 12 gates would lose mechanical strength particularly when furrows are formed in the peripheral surface according to the invention as will be described below.

According to the invention, the peripheral surface 12 of the mold segment 1b is corrugated except for the areas where the gates 7 are disposed. More particularly, a plurality of furrows 13 of semi-circular cross section are formed in the peripheral surface 12 of the lower mold segment 1b between the gates 7 and at an equal spacing or predetermined spacing. A corresponding plurality of furrows 13 of semi-circular cross section are formed in the peripheral surface 12 of the upper mold segment 1a. When the upper and lower mold segments 1a and 1b are mated, each pair of opposing furrows 13 face each other to define a cylindrical hole having a diameter corresponding to a desired dimple diameter. Cylindrical pins 14 having an inner end portion of dimple-forming shape are received in the cylindrical holes so as to lie across the parting line. It is noted that the inner end is used with respect to the center of the mold cavity.

The number of receiving holes defined by the furrows 13, that is, the number of cylindrical pins 14 received therein is preferably 5 to 20, more preferably 6 to 15. Less than 5 pins would be too small to improve the aerodynamic symmetry of the ball. The total number of the gates and the pins which are both arranged in the parting or peripheral surface should preferably be less than 30. The mold provided with more than 30 gates plus pins would lose mechanical strength. The number of cylindrical holes or pins 14 disposed between two adjacent gates 7 should preferably be equal throughout the circumference from the aspect of symmetry improvement.

The diameter of the receiving holes 13 that is equal to the diameter of the cylindrical pins 14 is preferably in the range of 2 to 4.5 mm. Then dimples having a diameter of 2 to 4.5 mm can be formed across the parting line. Also the projections 11 which are to form dimples outside the parting line should preferably have a diameter of 2 to 4.5 mm.

It is also preferred that there are formed two or more types of cylindrical holes 13, more preferably, holes having 2 to 6 different diameters. There are furnished cylindrical pins 14 having corresponding two or more different diameters. Then dimples having different diameters can be formed across the parting line. Of course, the dimple-forming projections 11 outside the parting line may have two or more different diameters, preferably 2 to 6 different diameters.

Also preferably, the dimple-forming projections 11 and the cylindrical pins 14 (exactly the inner end portions of the cylindrical pins) project into the cavity 2 to a distance of 0.08 to 0.25 mm as measured from the cavity-defining inner surface 2a of the mold segment 1b. Then dimples having a depth of 0.08 to 0.25 mm are formed. The projection distance of the pins 14 is preferably greater by at least 5 $\mu$m, especially 5 to 50 $\mu$m than the projection distance of those dimple-forming projections 11 of the same diameter which are disposed near the pole of the hemispherical inner surface 2a of the mold segment 1b, for the reason that the dimple depth becomes more uniform after polishing for deburring, that is, from the aspect of symmetry.

The pins 14 are secured to the furrows 13 by any suitable means such as applying silver braze to the furrows and placing the pin therein, or fastening the pins to the furrows with screws. In this regard, the pins 14 may be secured to the furrow 13 in either of the upper and lower mold segments 1a and 1b.

The total number of dimples distributed on the golf ball is preferably 240 to 600, more preferably 340 to 450. Also, the type of dimples distributed throughout the ball is not limited to one, and two or more types, especially 2 to 6 types of dimples may be formed. The planar shape of dimples is not critical and various shapes are acceptable although dimples of circular planar shape are preferred in most cases.

Figure 3:
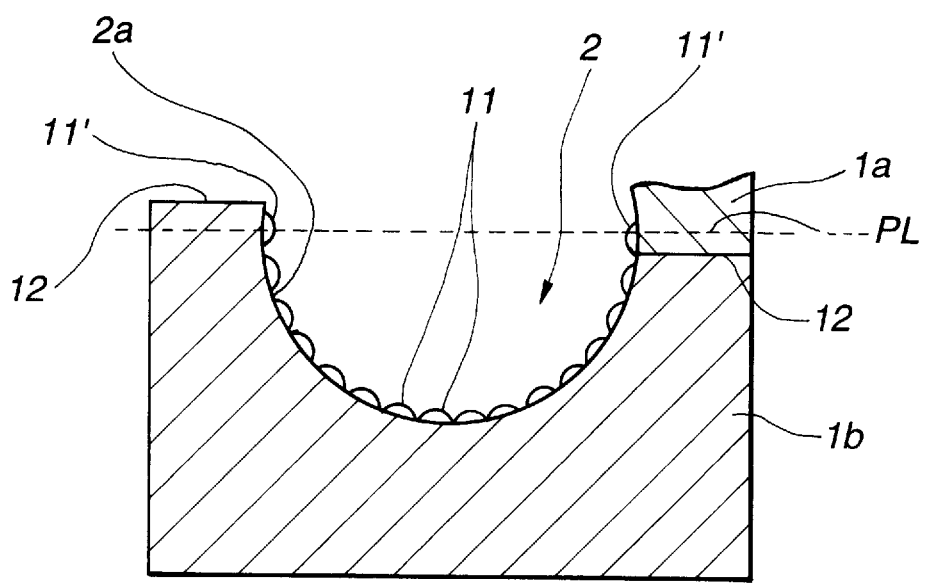
FIG. 3 is an elevational cross-sectional view of an injection mold according to another embodiment of the invention.
Figure 4A:
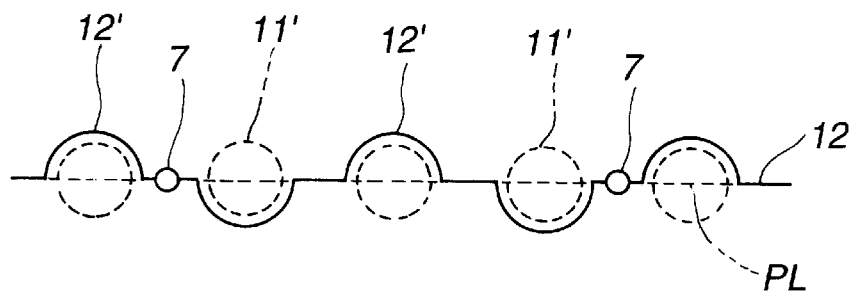
FIG. 4 is a partial enlarged view of the mold of FIG. 3 near the parting line, FIGS. 4A, 4B, and 4C showing corrugations of semi-circular, triangular and trapezoidal cross sectional shapes, respectively.
Figure 4B:
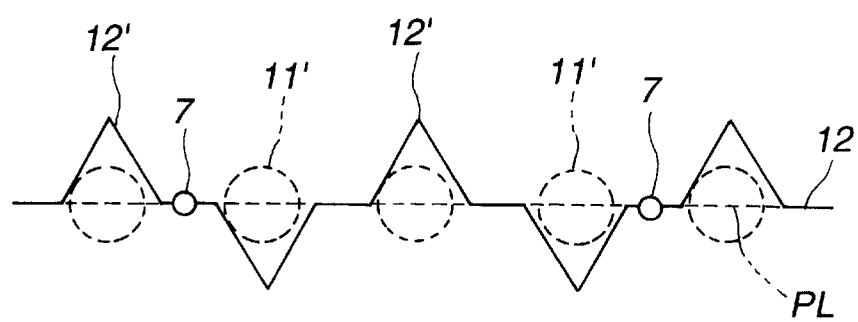
Figure 4C:
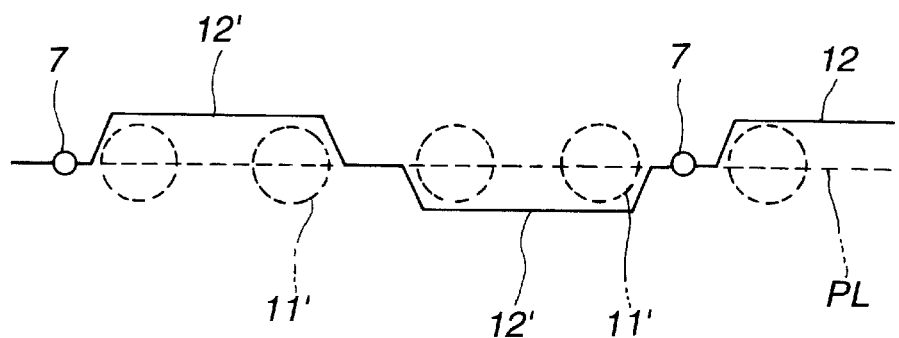

FIGS. 3 and 4 illustrate a mold according to another embodiment of the invention. The parting or peripheral surfaces 12 of the upper and lower mold segments 1a and 1b are corrugated so that they may interdigitate each other. The corrugations in one peripheral surface 12 include a series of convex and concave portions. The convex portions 12' at the inner side are provided with dimple-forming projections 11'. Then dimples lying across the parting line PL can be formed. The number and shape of the dimple-forming projections 11' are the same as the aforementioned pins 14. The corrugations in the peripheral surface 12 may be alternating convex and concave portions 12' of semi-circular cross section as shown in FIG. 4A, triangular cross section as shown in FIG. 4B, or trapezoidal cross section as shown in FIG. 4C. The corrugations may be continuous or connected by flat lands as in the illustrated embodiments. The number of dimple-forming projections 11' formed within each convex portion 12' is not limited to one. For example, two dimple-forming projections 11' may be formed within each convex portion 12' as shown in FIG. 4C and as the case may be, more than two dimple-forming projections 11' are formed. Although the dimple-forming projections 11' are disposed such that the projections 11' are aligned with the parting line PL in the embodiment of FIG. 4, the center of projections 11' may be positioned off the parting line PL insofar as the projections 11' lie across the parting line PL.

Figure 5A:
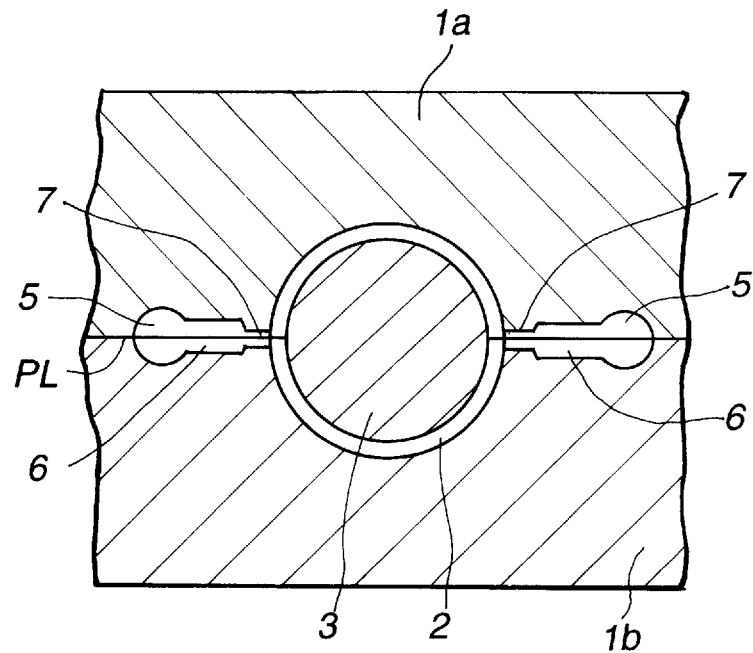
FIG. 5 illustrates a prior art injection mold for golf balls comprising a pair of mold segments, FIG. 5A being an elevational cross-sectional view and FIG. 5B being a plan view of the lower mold segment.
Figure 5B:
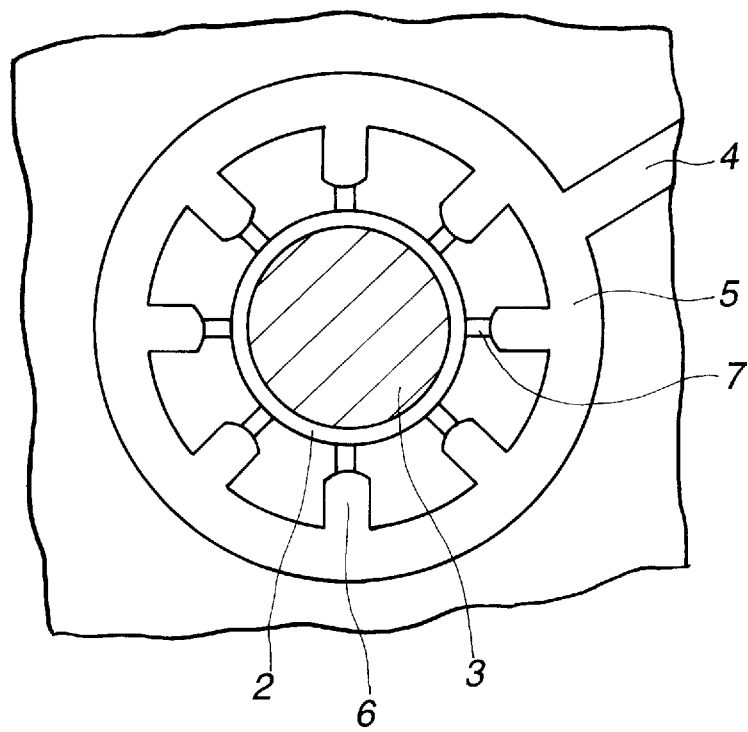

When golf balls are injection molded in the mold of the invention, the procedure and conditions may be the same as in prior art molds. For example, a two-piece solid golf ball having a cover injection molded over a solid core can be manufactured, for example, by placing the solid core 3 at the center of the cavity 2 as shown in FIG. 5, mating the upper and lower mold segments 1a and 1b together to close the cavity 2, injection feeding a cover stock, typically ionomer resin compound in a molten state into the cavity 2 through the gates 7, cooling the cover stock for solidification, opening the upper mold segment 1a, removing the molded part, cutting the gate ribs, and trimming off burrs.

The mold of the invention in which the gates can be reduced in diameter and arranged to open at land areas of the ball has the advantage that the formation of burrs is minimized and the extension of burrs to the dimples is prevented. This mitigates the burden of post treatment. The injection molding technique eliminates the steps of preforming half cups and enclosing a core with the half cups as required in the heat compression molding technique. Thus the invention has excellent productivity and economy.

The golf ball manufactured by the present method is significantly improved in aerodynamic symmetry in that several dimples lie across the parting line and there exist no great circles which do not intersect with the dimples. There is manufactured a golf ball of quality featuring good symmetry and consistent flight performance.

The mold and method of the invention are applicable to the manufacture of all types of golf balls by injection molding, including one-piece solid golf balls by single injection molding, solid golf balls such as two-piece golf balls and multi-piece golf balls of three or more layer structure by forming a cover layer around a solid core, and wound golf balls by forming a cover layer around a wound core. The material to be injected is selected from well-known stock materials.

With respect to the dimple arrangement, a choice may be made among regular icosahedral, regular octahedral and regular tetrahedral arrangements, an arrangement which is twice symmetric on the golf ball semi-sphere about the pole, an arrangement which is four times symmetric on the golf ball semi-sphere about the pole, and an arrangement which is five times symmetric on the golf ball semi-sphere about the pole.

Understandably, the diameter, weight and other parameters of the golf ball may be properly determined in accordance with the Rules of Golf.

The invention is not limited to the illustrated embodiments. For example, the number, position and inner end shape of dimple-forming pins disposed in the mold may vary over a wide range. Although some preferred embodiments have been described, many modifications and variations may be made thereto in the light of the above teachings. It is therefore to be understood that within the scope of the appended claims, the invention may be practiced otherwise than as specifically described.

We claim:

1. In an injection mold for golf balls comprising a pair of separable mold segments each having an inner surface and a peripheral surface, the mold segments being mated at their peripheral surfaces along a parting line so that their inner surfaces define a spherical cavity, a plurality of dimple-forming projections formed on the inner surfaces of the mold segments, and a plurality of tubular gates disposed in the peripheral surfaces of the mold segments and in fluid communication with the cavity, the improvement wherein at least four gates are disposed, the peripheral surfaces of the mold segments are corrugated except for the areas where the gates are disposed, and dimple-forming projections are disposed at the corrugations so as to lie across the parting line.

2. The injection mold of claim 1 wherein the corrugations in the peripheral surfaces of the mold segments are semi-circular furrows which are arranged such that each pair of opposed semi-circular furrows define a cylindrical hole having a diameter corresponding to a desired dimple diameter when the mold segments are mated, and a cylindrical pin having an inner end portion of dimple-forming shape is received in said cylindrical hole.

3. The injection mold of claim 2 wherein the peripheral surfaces of the mold segments are formed with the semi-circular furrows so as to define 5 to 20 cylindrical holes, and the cylindrical pin is received in each cylindrical hole.

4. The injection mold of claim 2 wherein said cylindrical holes have a diameter of 2 to 4.5 mm so that dimples having the corresponding diameter of 2 to 4.5 mm may be formed along the parting line.

5. The injection mold of claim 2 wherein said cylindrical holes have two or more different diameters so that dimples having the corresponding different diameters may be formed along the parting line.

6. The injection mold of claim 2 wherein the cylindrical pin is received in said cylindrical hole such that the inner end portion of the cylindrical pin projects to a projection distance which is greater by at least 5 $\mu$m than the projection distance of those dimple-forming projections of the same diameter disposed near the poles of the hemi-spherical inner surfaces of the mold segments.

7. A method for preparing a golf ball comprising the step of injecting a stock material into the cavity of the injection mold of claim 1 through the gates to mold a golf ball.

8. The injection mod of claim 2, wherein the number of gates is in the range of 6 to 12.

9. The injection mold of claim 2, wherein said gates have a diameter in the range of 0.8 to 1.5 mm.

10. The injection mold of claim 2, wherein a total number of gates and cylindrical pins is less than 30.

11. The injection mold of claim 2, wherein the number of said gates is in the range of 6 to 8.

12. The injection mold of claim 3, wherein the number of cylindrical holes is in the range of 6 to 15.

13. The injection mold of claim 6, wherein said cylindrical pins project a projection distance of 0.08 to 0.25 mm into said spherical cavity.

* * * * *

UNITED STATES PATENT AND TRADEMARK OFFICE
CERTIFICATE OF CORRRECTION

PATENT NO. : 5,874,038
DATED : February 23, 1999
INVENTOR(S) : Atsuki Kasashima, et al.

It is certified that error appears in the above-identified patent and that said Letters Patent is hereby corrected as shown below:

On the title page, insert item [56]:

FOREIGN PATENT OR PUBLISHED FOREIGN PATENT APPLICATION

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | | 1 | 7 | 3 | 9 | 0 | 7 | 8/5/86 | Japan | | | | |
| | | 1 | 4 | 3 | 3 | 4 | 9 | 5/24/94 | Japan | | | | |

Signed and Sealed this

Eleventh Day of July, 2000

*Attest:*

Q. TODD DICKINSON

*Attesting Officer*     *Director of Patents and Trademarks*